(12) United States Patent
Beswick et al.

(10) Patent No.: US 7,018,107 B2
(45) Date of Patent: Mar. 28, 2006

(54) ROLLING BEARING COMPRISING A POWDER METALLURGICAL COMPONENT

(75) Inventors: John Michael Beswick, Montfoort (NL); Xiao Bo Zhou, Nieuwegein (NL)

(73) Assignee: AB SKF, Gothenburg (SE)

( * ) Notice: Subject to any disclaimer, the term of this patent is extended or adjusted under 35 U.S.C. 154(b) by 0 days.

(21) Appl. No.: 10/433,652

(22) PCT Filed: Dec. 6, 2001

(86) PCT No.: PCT/NL01/00888

§ 371 (c)(1),
(2), (4) Date: Jul. 28, 2003

(87) PCT Pub. No.: WO02/48565

PCT Pub. Date: Jun. 20, 2002

(65) Prior Publication Data

US 2004/0071378 A1    Apr. 15, 2004

(30) Foreign Application Priority Data

Dec. 6, 2000   (NL) .................................. 1016811

(51) Int. Cl.
*F16C 19/06* (2006.01)

(52) U.S. Cl. ...................................... 384/565; 384/569
(58) Field of Classification Search ................ 384/492, 384/912, 913, 565, 569
See application file for complete search history.

(56) References Cited

U.S. PATENT DOCUMENTS 6,553,097 B1 * 4/2003 Hansen et al. .............. 378/144

FOREIGN PATENT DOCUMENTS

| | | |
|---|---|---|
| DE | 2 352 578 | 6/1974 |
| GB | 1 357 526 | 6/1974 |
| JP | A 05-239602 | 9/1993 |
| JP | A 09-25938 | 1/1997 |
| WO | WO 99/02873 | 1/1999 |

* cited by examiner

Primary Examiner—Lenard A. Footland
(74) Attorney, Agent, or Firm—Oliff & Berridge, PLC

(57) ABSTRACT

Rolling bearing comprising an inner ring, rolling elements and an outer ring. According to one aspect of the invention the inner ring is produced by M62 steel powder metallurgical technique whilst the outer ring is a conventional stool ring. According to another aspect a rolling bearing having at least one component produced by powder metallurgy technique is in a actively lubricated condition.

11 Claims, 4 Drawing Sheets

ROLLING BEARING COMPRISING A POWDER METALLURGICAL COMPONENT

The present invention relates to a rolling bearing comprising an inner ring, rolling elements and an outer ring, said outer ring comprising a ball bearing steel produced by casting, forging and machining. Such a rolling bearing is generally known. A rolling bearing used in a high temperature application (for example a Röntgen apparatus), where no lubricant is present is also known. In order to withstand the high temperature all the components of such rolling bearing are made with the high alloy powder metallurgy technique.

For heavier loading and at lower temperature rolling bearings are used in an actively lubricated condition. For example, in gear boxes oil is either circulated by a pump or by movement of gears. A lubricant can only reach the surface between the rolling elements and the inner and outer ring if such rolling bearings are unsealed.

Many applications are sealed for life, i.e. there are no provisions for changing oil which could possibly be contaminated.

However, it has been observed that especially during running in but also during a later stage, the lubricant becomes contaminated. Contamination can also be promoted by unfavourable operating conditions. An example can be found in gear transmissions of paper mills.

Because of the presence of contamination in the lubricant service life of the related rolling bearings is dramatically reduced. Normally, failure is due to a rolling contact fatigue mechanism, which is accelerated through abrasive wear and related surface fatigue damage. Hard particles such as contamination in the lubricant damages the components of the bearing and such hard particles are embedded in the rolling bearing surfaces. The resulting high roughness of the rings and rolling elements gives poor lubricating conditions due to the metal to metal contact at the asperity peaks. The closed asperities shear during the rolling motion, which initiates surface cracks and accelerates the crack propagation, shortening the bearing life as compared to non-contaminated lubricant conditions.

In the Japanese patent application 09 025 938 a bearing is disclosed having an usual inner ring and an outer ring of two outer ring parts, which are sintered together and made from a sintering alloy, which is subsequently impregnated with lubricant oil.

It is aimed to provide a rolling bearing which is abl to resist the disadvantageous effects of (hard) contamination in lubricant, i.e. which is embodied such that early failure due to rolling contact fatigue is prevented.

This means that such a rolling bearing should meet at least the following requirements:

high abrasive wear resistance to prevent development of high surface roughness and thus metal to metal closed asperity shear fracture;

high local toughness and resistance to crack growth.

According to the invention this aim is realized in that said inner ring comprises a ball bearing steel produced by high alloy powder metallurgical techniques.

The invention also relates to the use of a rolling bearing having at least a component such as a ring produced by high alloy powder metallurgy technique for supporting a shaft, wherein said rolling bearing is in an actively lubricated condition.

From EP 0875588 A2 and EP 0076027 A2 the use of a material containing a high volume fraction of hard fine carbides is generally known for tools which require good wear resistance, toughness, strength and resistance to thermal fatigue and shock.

It has now surprisingly be found that such micro structure with a high volume fraction of hard, fine carbides performs better under contaminated lubrication condition. This means that if the component of a rolling bearing is made of such material, the chances of failure because of rolling contact fatigue will be considerably reduced.

It has been found that in particular the inner ring of a rolling bearing is subjected to rolling contact fatigue failure. However, also other components of a bearing could benefit from the use of powder metallurgy technique for the production thereof.

According to a preferred embodiment of the invention the powder metallurgy material comprises a M62 Steel. This is a steel having 1.3–1.4% by wt. C, max. 0.035% by wt. S, 3.50–4.25% by wt. Cr, 1.75–2.20% by wt. V, 5.75–6.50% by wt. W and 10.00–11.00% wt Mo. Such a powder steel could be prepared by vacuum induction, nitrogen gas atomation, blending, screening, filling or canning ad outgassing. Shaping can be realised by rotary hot bar forging followed by spheroidise annealing.

A very cost effective rolling bearing can be obtained if either the rolling element or the outer ring comprises a non PM Steel. This means that only the part which is most subjected to contact fatigue loading will be made of the material which has the highest resistance there against.

An example of a microstructure which results in significantly improved rolling contact fatigue service life according to the invention comprises 12–15 volume % of 0.5–3 micron $M_6C$ carbides and about 8 volume % of $M_{23}C_6$ carbides of about 1 nanometer. This carbides are embedded in a matrix which is produced by tempering at a temperature high enough to produce fine $M_{23}C_6$ precipitation. High temperature tempering results in an increased toughness and thus a slower crack propagation rate and resistance to surface spalling fatigue.

The invention will now be elucidated referring to the figures, wherein.

Figure 3:
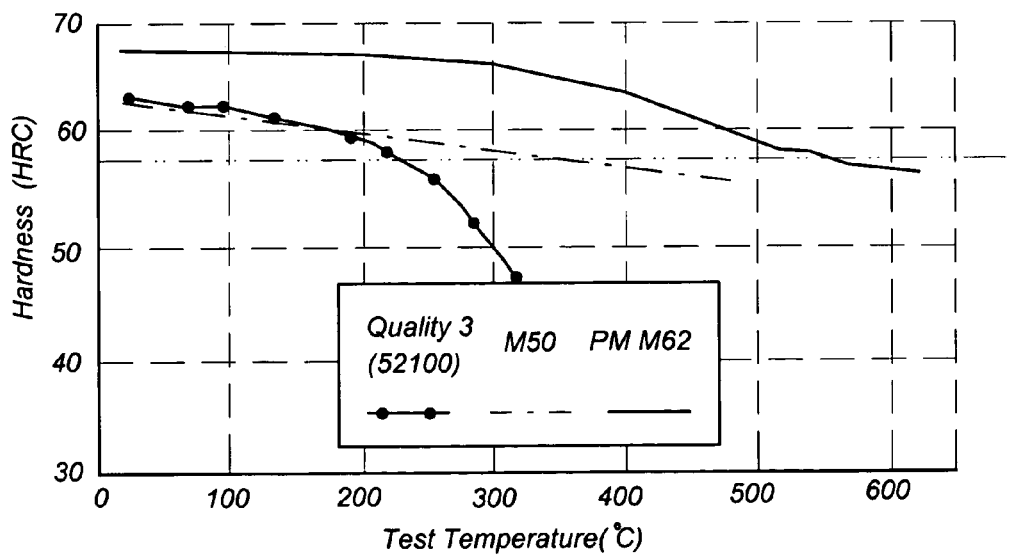
Figure 4:
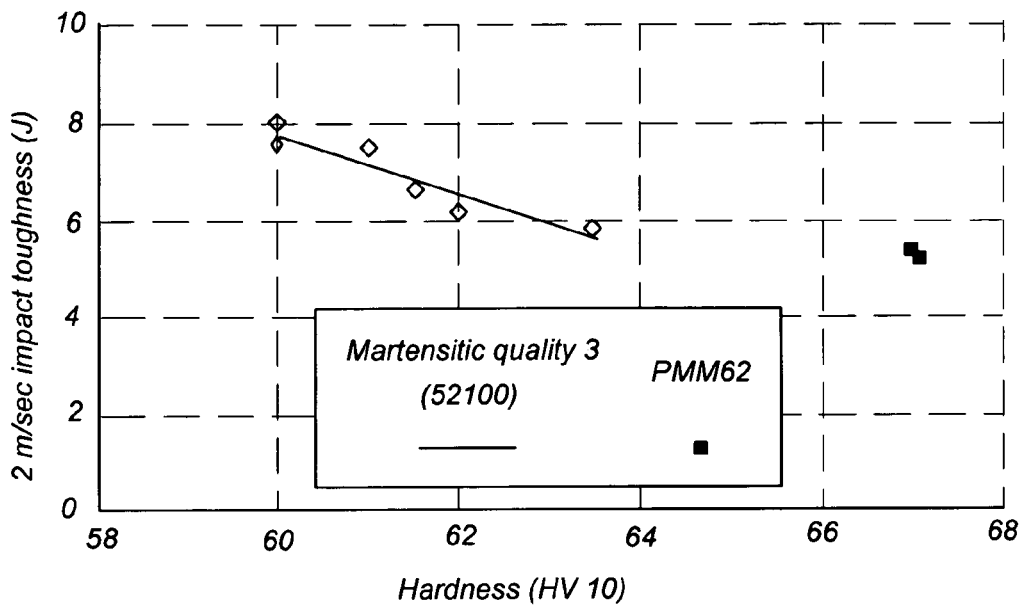
Figure 5:
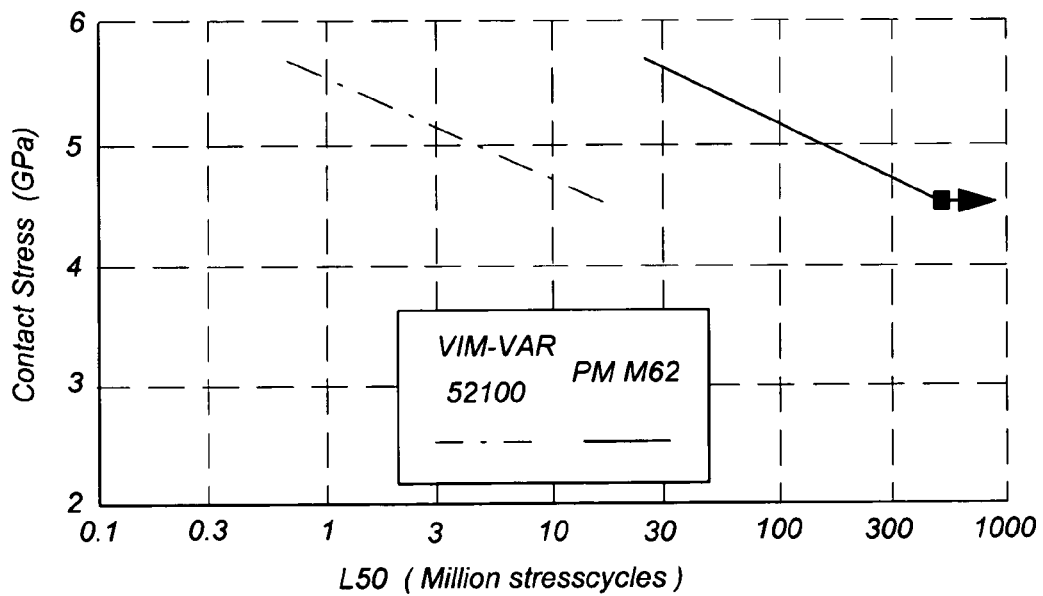
Figure 6:
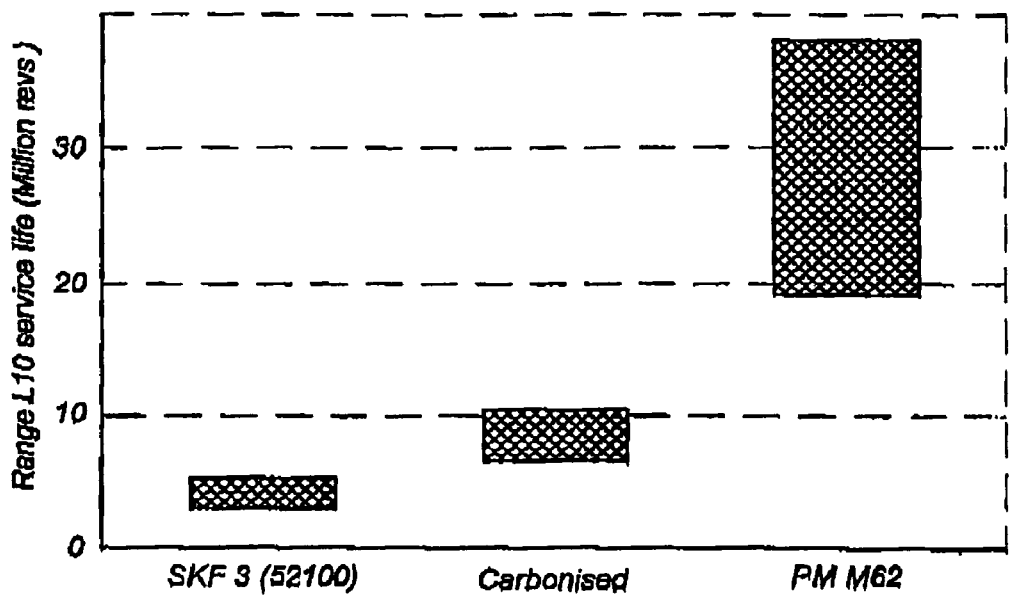

FIG. 3 hot hardness data compared with other steels;

FIG. 4 toughness data;

FIG. 5 rolling contact fatigue strength compared with other materials;

FIG. 6 bearing life/run-in contamination conditions; and

Figure 7:
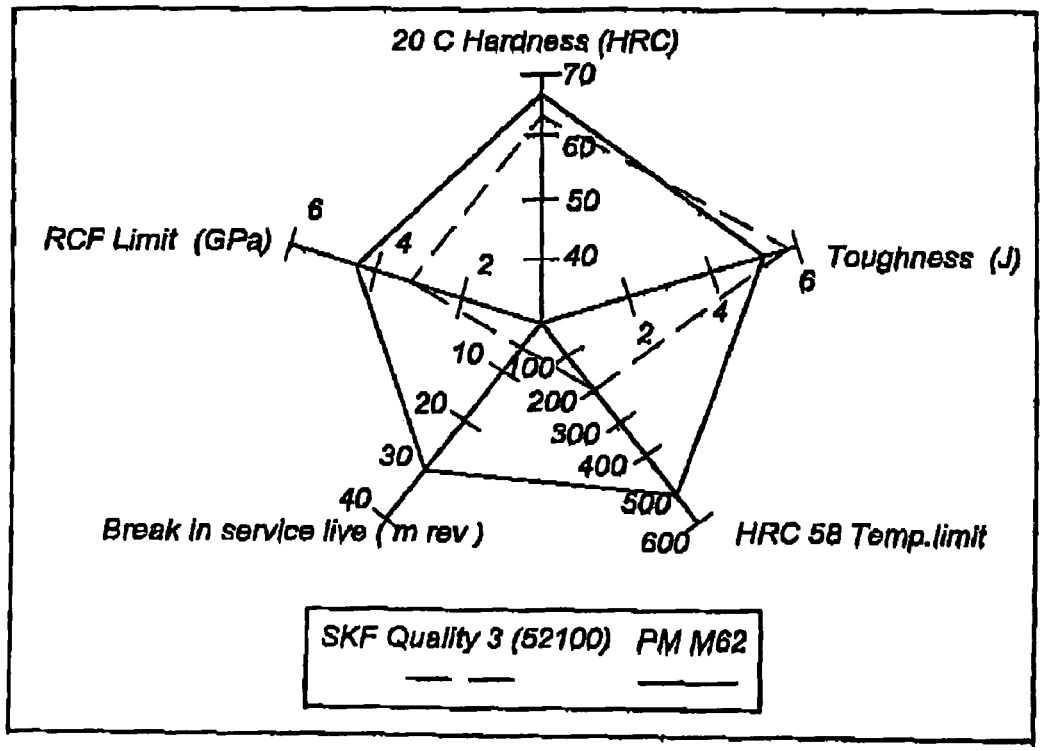

FIG. 7 summary of rolling bearing steels properties.

Figure 1:
FIG. 1 shows a transmission electron micrograph of a part of a rolling bearing produced according to the invention.

In FIG. 1 a transmission electron micrograph of a part of metallurgy material comprising $M_6C$ carbides and $M_{23}C_6$ carbides is shown. This a PM M62 Steel of which the composition is given above.

Figure 2:
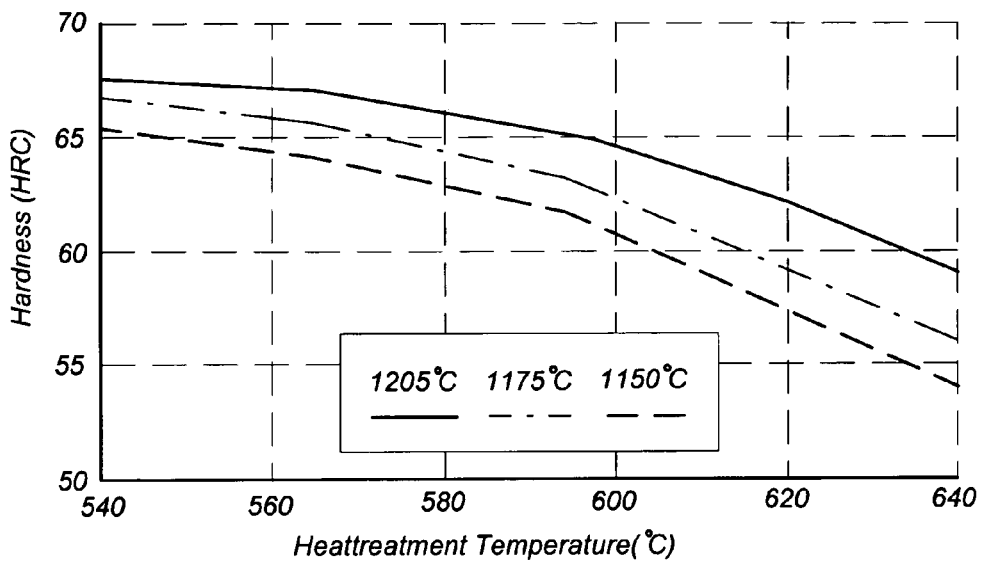
FIG. 2 shows the hardening data of a PM M62 Steel.

In FIG. 2 the hardening data of PM M62 steel are shown at several temperatures. It is clear that increasing the hardening temperature from 1150° C. tot 1205° C. will result in a substantial increase in hardness.

FIG. 3 shows the hot hardness of several materials. The superior properties of PM M62 are immediately clear.

FIG. 4 shows the toughness of PM M62 compared to martensite grade 3 (52100) material.

FIG. 5 shows the increase of L50 of a PM M62 material compared with a VIM (vacuum induction melted) VAR (vacuum arc remelted) 52100 steel as used in deep groove ball bearings with run-in contaminated conditions. It is clear that the PM material has superior properties.

This is also confirmed by FIG. 6 which shows a steel of applicant, a carbonitrated steel and PM M62 material. Finally, FIG. 7 shows a summary of the properties of several steels to be used in rolling bearings. According to subject application powder metallurgy technology and more particular, PM M62 Steel technology is used in rolling bearings and more particular, the inner ring thereof, where contact loads, temperature and lubrication contamination levels are in access of the capabilities of rolling bearings produced from standard rolling bearing steel. If service life is a problem of standard steel or downsizing of bearings is required, the above powder metallurgy materials can be used. Applications are powder rollers for infinity variable transmissions. However, other applications wherein contamination is a problem are within the range of subject application. As indicated above, the invention is not restricted to the use for inner rings but also for outer ring and rolling bearing elements.

The enclosed claims also encompass embodiments which are not described above but which will be immediately obvious for the person skilled in the art after reading the above description.

What is claimed is:

1. A roller bearing comprising:
    a hardened inner ring comprising a ball bearing steel produced by a powder metallurgical technique using a powder metallurgy component including M62 steel;
    rolling elements, a liquid connection being provided between the rolling elements and their surroundings; and
    an outer ring comprising a casted, forged and machined ball bearing steel.

2. The roller bearing according to claim 1, further comprising:
    impregnating the roller bearing with lubricant oil.

3. The roller bearing according to claim 2, wherein the surface structure of the inner ring comprises 10–17 vol.% $M_6C$ carbides and $\cong 8$ vol. % $M_{23}C$ carbides.

4. The roller bearing according to claim 3, wherein the $M_6C$ carbides have a particle size of about 1 nm.

5. The roller bearing according to claim 2, further comprising:
    the roller element comprising a non-PM steel.

6. The roller bearing according to claim 1, further comprising:
    the rolling element comprising a non-PM steel.

7. The roller bearing according to claim 6, wherein the surface structure of the inner ring comprises 10–17 vol.% $M_6C$ carbides and $\cong 8$ vol. % $M_{23}C$ carbides.

8. The roller bearing according to claim 1, wherein the surface structure of the inner ring comprises 10–17 vol.% $M_6C$ carbides and $\cong 8$ vol. % $M_{23}C$ carbides.

9. The roller bearing according to claim 8, wherein the $M_6C$ carbides have a particle size of 0.5–3 μm.

10. The roller bearing according to claim 9, wherein the $M_6C$ carbides have a particle size of about 1 nm.

11. The roller bearing according to claim 1, wherein the outer ring and the rolling elements comprise a ball bearing steel produced by powder metallurgical technique using a powder metallurgy component including M62 steel.

* * * * *